United States Patent
Skalicky et al.

(10) Patent No.: US 10,416,315 B2
(45) Date of Patent: Sep. 17, 2019

(54) FALSE ALARM DISTRIBUTION IN ADVANCED RECEIVER AUTONOMOUS INTEGRITY MONITORING

(71) Applicant: Honeywell International Inc., Morris Plains, NJ (US)

(72) Inventors: Jakub Skalicky, Brno (CZ); Martin Orejas, Brno (CZ); Jussi Raasakka, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 366 days.

(21) Appl. No.: 15/452,320

(22) Filed: Mar. 7, 2017

(65) Prior Publication Data

US 2018/0259648 A1    Sep. 13, 2018

(51) Int. Cl.
   *G01S 19/20*    (2010.01)
(52) U.S. Cl.
   CPC ........................ *G01S 19/20* (2013.01)
(58) Field of Classification Search
   CPC ........ G01S 19/20; G01S 19/215; G01S 19/15; G01S 19/252; G01C 21/165
   USPC .................................................. 342/357.58
   See application file for complete search history.

(56) References Cited

U.S. PATENT DOCUMENTS

| | | | |
|---|---|---|---|
| 5,760,737 A | 6/1998 | Brenner | |
| 6,205,377 B1 | 3/2001 | Lupash et al. | |
| 6,639,549 B2 | 10/2003 | Vanderwerf et al. | |
| 6,847,893 B1 | 1/2005 | Lupash | |
| 7,839,327 B2 | 11/2010 | Riley et al. | |

(Continued)

FOREIGN PATENT DOCUMENTS

| | | |
|---|---|---|
| CA | 2645656 | 7/2016 |
| CA | 2923263 A1 | 9/2016 |

(Continued)

OTHER PUBLICATIONS

European Patent Office, "Communication under Rule 71(3) EPC from EP Application No. 16158851.2 dated Jan. 9, 2017", "from Foreign Counterpart of U.S. Appl. No. 14/658,372", dated Jan. 9, 2017, pp. 1-29, Published in: EP.

(Continued)

*Primary Examiner* — Harry K Liu
(74) *Attorney, Agent, or Firm* — Fogg & Powers

(57) ABSTRACT

A Global Navigation Satellite System receiver comprising at least one processor is provided. The processor is configured to: determine a weighted false alarm probability allocation for at least one sub-solution in a solution separation based integrity monitoring module, wherein the weighted false alarm probability allocation is based on pre-determined values for missed detection probability and fault probability for the sub-solution, wherein the at least one sub-solution is created by excluding a set of potentially faulty satellites from a full solution, wherein a fault mode occurs when there is a faulty satellite in the excluded set of potentially faulty satellite, wherein the at least one sub-solution's missed detection probability is probability that detection of associated fault mode occurrence in a sub-solution was missed, and wherein the at least one sub-solution's fault probability is probability that the fault mode occurs; compute a weighted protection level based on the weighted false alarm probability.

20 Claims, 2 Drawing Sheets

(56) References Cited

U.S. PATENT DOCUMENTS

| | | | |
|---|---|---|---|
| 8,014,948 | B2 | 9/2011 | Vanderwerf |
| 8,085,196 | B2 | 12/2011 | Whitehead |
| 8,094,069 | B2 | 1/2012 | Rang et al. |
| 8,106,823 | B2 | 1/2012 | Schroth |
| 8,193,976 | B2 | 6/2012 | Shen et al. |
| 8,659,474 | B2 | 2/2014 | Dai et al. |
| 8,717,234 | B2 | 5/2014 | Laine |
| 8,976,064 | B2 | 3/2015 | Brenner |
| 9,146,320 | B2 | 9/2015 | Najim et al. |
| 9,158,002 | B2 | 10/2015 | Pratt et al. |
| 9,244,172 | B2 | 1/2016 | O'Connor et al. |
| 9,285,479 | B2 | 3/2016 | O'Connor et al. |
| 9,341,718 | B2 * | 5/2016 | Vanderwerf ............ G01S 19/20 |
| 9,411,051 | B2 | 8/2016 | Sagiraju et al. |
| 9,488,734 | B2 | 11/2016 | Davain |
| 9,547,086 | B2 | 1/2017 | Dunik et al. |
| 9,885,788 | B2 | 2/2018 | Skalicky et al. |
| 2003/0231132 | A1 | 12/2003 | Park |
| 2008/0062041 | A1 * | 3/2008 | Lee .................... G01S 19/46 342/357.29 |
| 2008/0186229 | A1 | 8/2008 | Van Diggelen et al. |
| 2009/0150074 | A1 * | 6/2009 | Vanderwerf ............ G01S 19/20 701/469 |
| 2011/0041136 | A1 * | 2/2011 | Messier ................ G06F 9/5066 718/105 |
| 2013/0002480 | A1 | 1/2013 | Pratt et al. |
| 2013/0021198 | A1 | 1/2013 | Pratt et al. |
| 2013/0050020 | A1 * | 2/2013 | Peck .................. G01S 19/15 342/357.27 |
| 2014/0232595 | A1 | 8/2014 | Rife |
| 2014/0240171 | A1 | 8/2014 | Cho et al. |
| 2014/0292574 | A1 | 10/2014 | Dunik et al. |
| 2015/0145719 | A1 | 5/2015 | Dunik et al. |
| 2015/0145724 | A1 | 5/2015 | Kana et al. |
| 2016/0061956 | A1 | 3/2016 | Savoy, Jr. et al. |
| 2016/0178752 | A1 | 6/2016 | Davies et al. |
| 2016/0216378 | A1 | 7/2016 | Davain |
| 2016/0274242 | A1 | 9/2016 | Skalicky et al. |
| 2017/0139052 | A1 | 5/2017 | Skalicky et al. |
| 2017/0146663 | A1 | 5/2017 | Skalicky et al. |
| 2018/0081064 | A1 | 3/2018 | Skalicky et al. |

FOREIGN PATENT DOCUMENTS

| | | |
|---|---|---|
| CN | 101520503 | 7/2011 |
| CN | 102540213 | 10/2013 |
| CN | 103592658 | 2/2014 |
| EP | 2461182 A1 | 6/2012 |
| EP | 2887097 A2 | 6/2015 |
| EP | 3168647 A1 | 5/2017 |

OTHER PUBLICATIONS

European Patent Office, "Extended European Search Report from EP Application No. 16158851.2 dated Jul. 5, 2016", "from Foreign Counterpart of U.S. Appl. No. 14/658,372", dated Jul. 5, 2016, pp. 1-7, Published in: EP.
United States Patent and Trademark Office, "Notice of Allowance", "From U.S. Appl. No. 14/658,372", dated Sep. 27, 2017, pp. 1-28, Published in: US.
United States Patent and Trademark Office, "Office Action", "From U.S. Appl. No. 14/658,372", dated Mar. 15, 2017, pp. 1-28, Published in: US.
United States Patent and Trademark Office, "Supplemental Notice of Allowability", "From U.S. Appl. No. 14/658,372", dated Oct. 17, 2017, pp. 1-5, Published in: US.
European Patent Office, "Extended European Search Report from EP Application No. 16196671.8 dated Apr. 19, 2017", "from Foreign Counterpart of U.S. Appl. No. 15/221,399", dated Apr. 19, 2017, pp. 1-9, Published in: EP.
Skalicky et al., "Smart Satellite Distribution Into ARAIM Clusters for Use in Monitoring Integrity of Computed Navigation Solutions", "U.S. Appl. No. 15/221,399, filed Jul. 27, 2016", Jul. 27, 2016, pp. 1-37, Published in: US.
Blanch et al., "Advanced RAIM User Algorithm Description: Integrity Support Message Processing, Fault Detection, Exclusion, and Protection Level Calculation", "Proceedings of the 25th International Technical Meeting of the Satellite Division of the Institute of Navigation", Dec. 1, 2013, pp. 1-23, Publisher: ION GNSS 2012, Published in: Nashville, TN.
Castaldo et al., "P-RANSAC: An Integrity Monitoring Approach for GNSS Signal Degraded Scenario", "International Journal of Navigation and Observation", Sep. 23, 2014, pp. 1-12, vol. 2014, Publisher: Hindawi Publishing Corporation.
Orejas et al., "Implementation and Testing of Clustered ARAIM in a GPS/Galileo Receiver | Technical Program ION", "Retrieved Aug. 25, 2016 from https://www.ion.org/gnss/abstracts.cfm?paperID=4426", Sep. 14, 2016, pp. 1-4, Publisher: Institute of Navigation.
Kana et al., "Architectures for High Integrity Multi-Constellation Solution Separation", "Proceedings of the 27th International Technical Meeting of the ION Satellite Division, ION GNSS+ 2014, Sep. 8-12, 2014", Sep. 1, 2014, pp. 3554-3565.
Lee, "Investigation of Extending Receiver Autonomous Integrity Monitoring (RAIM) to Combined Use of Galileo and Modernized GPS", "ION GNSS 17th International Technical Meeting of the Satellite Division, Sep. 21-24, 2004", Sep. 1, 2004, pp. 1691-1698, Publisher: Proceedings of the 17th International Technical Meeting of he Satellite Division of The Institute of Navigation (ION GNSS 2004), Published in: Long Beach, CA.
Lee, "New Advanced RAIM with Improved Availability for Detecting Constellation-wide Faults, Using Two Independent Constellations", "Journal of The Institute of Navigation", Mar. 1, 2013, pp. 71-83, vol. 60, No. 1, Publisher: Institute of Navigation.
Liu et al., "A Recursive Quasi-optimal Fast Satellite Selection Method for GNSS Receivers", Nov. 1, 2009, pp. 1-11, Publisher: School of Information and Electronics, Beijing Institute of Technology.
Miaoyan et al., "Satellite Selection for Multi-Constellation", Apr. 1, 2008, pp. 1053-1059, Publisher: IEEE.
Orejas et al., "Multiconstellation GNSS/INS to Support LPV200 Approaches and Autolanding", "25th International Technical Meeting of the Satellite Division of the Institute of Navigation", Sep. 17-21, 2012, pp. 790-809, Published in: Nashville, TN.
Orejas et al., "Clustered ARAIM", "Proceedings of the 2016 International Technical Meeting", Jan. 25-28, 2016, pp. 224-230, Publisher: ION ITM 2016, Published in: US.
Orejas et al., "Implementation and Testing of Clustered ARAIM in a GPS/Galileo Receiver", "Proceedings of the 29th International Technical Meeting of the ION Satellite Division", Sep. 12-16, 2016, pp. 1360-1367, Publisher: ION GNSS+ 2016, Published in: US.
Rippl, "Real Time Advanced Receiver Autonomous Integrity Monitoring in DLR's Multi-Antenna GNSS Receiver", "International Technical Meeting (ITM) of the Institute of Navigation", Jan. 1, 2012, pp. 1767-1776, Published in: Newport Beach, CA.
Roongpiboonsopit et al., "A Multi-Constellations Satellite Selection Algorithm for Integrated Global Navigation Satellite Systems", "Retrived on Dec. 21, 2015 from web address http://dx.doi.org/10.1080/15472450903084238", Aug. 10, 2009, pp. 1-16.
Schroth et al., "Enhancements of the Range Consensus Algorithm (RANCO)", "GNSS 2008—Proceedings of the 21st International Technical Meeting of the Satellite Division of the Institute of Navigation", Sep. 19, 2008, pp. 93-103, Publisher: The Institute of Navigation, Published in: Manassas, VA.
Simon et al., "Advanced RAIM scheme and its evaluation for non-aeronautical users in different environments", "23rd International Technical Meeting of the Satellite Division of the Institute of Navigation, Sep. 21-24, 2010", Sep. 1, 2010, pp. 292-300, Published in: Portland, OR.
Su et al., "Receiver Autonomous Integrity Monitoring Availability and Fault Detection Capability Comparison Between BeiDou and GPS", May 1, 2014, pp. 313-324.
Tu et al., "Evaluation of GNSS Receiver Autonomous Integrity Monitoring for Multiple Outliers With a Smart Random Sample

(56) References Cited

OTHER PUBLICATIONS

Consensus Strategy", "Geoinformatics 2011, 19th International Conference", Jul. 1, 2011, pp. 1-6, Publisher: IEEE, Published in: US.

Walter et al., "Reduced Subset Analysis for Multi-Constellation ARAIM", "Institute of Navigation (ION) International Technical Meeting", Feb. 1, 2014, pp. 1-10.

Zhang et al., "A Fast Satellite Selection Algorithm: Beyond Four Satellites", Oct. 1, 2009, pp. 740-747, vol. 3, No. 5, Publisher: ISSS Journal of Selected Topics in Signal Processing.

Zhang et al., "Enhancements of the Satellite Selection Method for Multi-Constellation GNSS Using Convex Geometry", "Radar Conference 2013", Aug. 1, 2013, pp. 1-8, Publisher: IET International.

European Patent Office, "Extended European Search Report from EP Application No. 18160320.0 dated Jul. 25, 2018", "from Foreign Counterpart of U.S. Appl. No. 15/452,320", dated Jul. 25, 2018, pp. 1-10, Published in: EP.

Speidel, Jan et al., "Integrity for Aviation: Comparing Future Concepts", European Space Agency, "insideGNSS", Jul. / Aug. 2013, pp. 1-11.

Escher et al., "GPS/IRS Hybridization: Definition of Exclusion Radius Using Solution Separation Method", "IFIS 2002, 12th International Flight Inspection Symposium, 2002, Roma, Italy. 2002", , pp. 1-10.

Martineau et al., "Performance of Receiver Autonomous Integrity Monitoring (RAIM) for Vertically Guided Approaches", "ENC-GNSS 2008, Confrence Europenne de la Navigation, Apr. 2008, Toulouse, France.", , pp. 1-11.

McBurney, "Self-Contained GPS Integrity Monitoring Using a Censored Kalman Filter", "1988, Retrospective Theses and Dissertations. Paper 8791.", , pp. i-264, Publisher: http://lib.dr.iastate.edu/rtd.

A.C. Escher et al., "GPS/IRS Hybridization: Definition of Exclusion Radius Using Solution Separation Method", pp. 1-10, Published in: France.

Blanch et al, "Baseline Advanced RAIM User Algorithm and Possible Improvements", IEEE Transactions on Aerospace and Electronic Systems, dated Jan. 2015, pp. 713-732, vol. 51, No. 1, Publisher: IEEE.

Canadian Intellectual Property Office, "Notice of Allowance for CA Application No. 2,923,263", "from Foreign Counterpart to U.S. Appl. No. 15/452,320", pp. 1-1, Published in: CA.

European Patent Office, "Extended European Search Report for EP Application No. 17191493.0", "Foreign Counterpart to U.S. Appl. No. 15/599,455", dated Mar. 5, 2018, pp. 1-11, Published in: EP.

Gerbeth et al., "Satellite Selection Methodology for Horizontal Navigation and Integrity Algorithms", German Aerospace Center, Sep. 2016, pp. 1-10.

Tu et al., "Evaluation of GNSS Receiver Autonomous Integrity Monitoring for Multiple Outliers with a Smart Random Sample Consensus Strategy", 2011, pp. 1-6, IEEE.

U.S. Patent and Trademark Office, "Final Office Action", U.S. Appl. No. 15/221,399, dated Apr. 16, 2019, pp. 1-11, Published: US.

U.S. Patent and Trademark Office, "Office Action", U.S. Appl. No. 15/221,399, dated Sep. 20, 2018, pp. 1-44, Published: US.

Blanch et al., "RAIM with Optimal Integrity and Continuity Allocations Under Multiple Failures", IEEE Transactions on Aerospace and Electronic Systems, vol. 46, No. 3, pp. 1235-1247; Jul. 2010.

\* cited by examiner

FALSE ALARM DISTRIBUTION IN ADVANCED RECEIVER AUTONOMOUS INTEGRITY MONITORING

CROSS-REFERENCE TO RELATED APPLICATIONS

This application is related to U.S. patent application Ser. No. 14/658,372 entitled "SATELLITE SUBSET SELECTION FOR USE IN MONITORING THE INTEGRITY OF COMPUTED NAVIGATION SOLUTIONS" filed on Mar. 16, 2015 (hereinafter the '372 Application), which is hereby incorporated herein by reference.

This application is related to U.S. patent application Ser. No. 15/221,399 entitled "SMART SATELLITE DISTRIBUTION INTO ARAIM CLUSTERS FOR USE IN MONITORING INTEGRITY OF COMPUTED NAVIGATION SOLUTIONS" filed on Jul. 27, 2016, which is hereby incorporated herein by reference.

BACKGROUND

In safety of life applications such as civil air transport, maritime or railroad, each operation has defined integrity requirements. As the term is used herein, "integrity" is the measure of trust that can be placed in the correctness of the information supplied by a navigation system. Integrity parameters include the integrity risk (or probability of hazardously misleading information, PHMI)—the probability that at any moment the true position error exceeds the protection level without an alert. As the term is used herein, a computed "horizontal protection level" is be defined as the radius of a circle in the horizontal plane centered around the true position, which is assured to contain the computed position with specified integrity level. Similarly, a "vertical protection level" is the maximal vertical difference between the true position and the calculated position of a receiver with specified integrity level. When the protection level exceeds an alert limit for a given operation or procedure, there is not enough integrity in the calculated position to perform that procedure. For instance, pilots must then revert to a less stringent one procedure or use a different source of navigation that provides enough integrity. Accordingly, the ability to obtain a low protection level is desired to enable more stringent operations or extend the area where they are available.

The user determines whether integrity monitoring in vertical, horizontal or both directions is required according to the desired procedure. For the sake of clarity only the term protection level is used henceforward to mark either one as the computational considerations are interchangeable.

While monitoring integrity protects the user from excessive position errors, unnecessary warnings may disrupt continuity, i.e. the vehicle's ability to perform its function without an interruption during a procedure. Therefore, probability of false alarms should be upper bounded by the desired value derived from the continuity requirement. False alarms occur when the system raises an alarm about an inconsistency in the measurements even though a fault does not exist in the pseudorange measurements available to the receiver.

One way of monitoring integrity of indicated position of an aircraft in conventional systems is by using what is commonly referred to as the "solution separation method". The solution separation method is based on computing the difference between a "full-solution" navigation solution that is rendered using all visible satellites (including a quantity of N visible satellites) and a set of navigation "sub-solutions" that are each rendered using a quantity of N−1 visible satellites. In computing the set of navigation sub-solutions, only one satellite fault is assumed at a time, and each "sub-solution" (protecting from some fault mode) is given the same value of false alarm and missed detection probabilities. Then a statistical limit on the separation between the true and the indicated position satisfying both probabilities is computed for each sub-solution and the largest such limit is output as the resultant protection level. When the probability allocations are even, respective limits are unequal due to different covariance of each sub-solution. Consequently, with respect to the resultant protection level (which is larger than or equal to respective limits), individual missed detection probabilities are lower than or equal to those originally intended.

Some conventional systems include receivers equipped with Advanced Receiver Autonomous Integrity Monitoring (ARAIM) for monitoring integrity. ARAIM is based on the solution separation method. For each sufficiently likely fault mode a navigation sub-solution that does not contain the potentially faulty satellites and/or constellations is created. For each sub-solution, a threshold on its fault-free separation from the full solution is created based on its allocation of the whole false alarm budget. The threshold is then compared to the test statistic yielded from actual pseudorange measurements in order to identify a fault. If no fault is present, the protection level is computed as an implicit solution to an equation expressing integrity risk as a function of a protection level and sub-solutions' thresholds, covariances and biases. The equation may conventionally be solved numerically by interval halving. In this way, the protection level is equal to each and every limit and accordingly, the distribution of missed detection probability is optimized.

However, in conventional systems using ARAIM, optimal distribution of the false alarm allocation remains unresolved. Conventional false alarm allocation is even, i.e. each sub-solution's threshold is given the same value. Some conventional systems that have attempted to optimize the allocation of the whole false alarm budget have required significant computational effort in addition to the usual ARAIM load and often does not provide lower protection levels than traditional ARAIM.

For the reasons stated above and for the reasons stated below which will become apparent to those skilled in the art upon reading and understanding the specification, there is a need in the art for improved systems and methods for lowering protection levels by optimal false alarm distribution.

SUMMARY

A Global Navigation Satellite System receiver comprising at least one processor is provided. The processor is configured to: determine a weighted false alarm probability allocation for at least one sub-solution in a solution separation based integrity monitoring module, wherein the weighted false alarm probability allocation is based on pre-determined values for missed detection probability and fault probability for the sub-solution, wherein the at least one sub-solution is created by excluding a set of potentially faulty satellites from a full solution, wherein a fault mode occurs when there is a faulty satellite in the excluded set of potentially faulty satellite, wherein the at least one sub-solution's missed detection probability is probability that detection of associated fault mode occurrence in a sub-solution was missed, and wherein the at least one sub-solution's fault probability is probability that the fault mode occurs; compute a weighted protection level based on the weighted false alarm probability.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
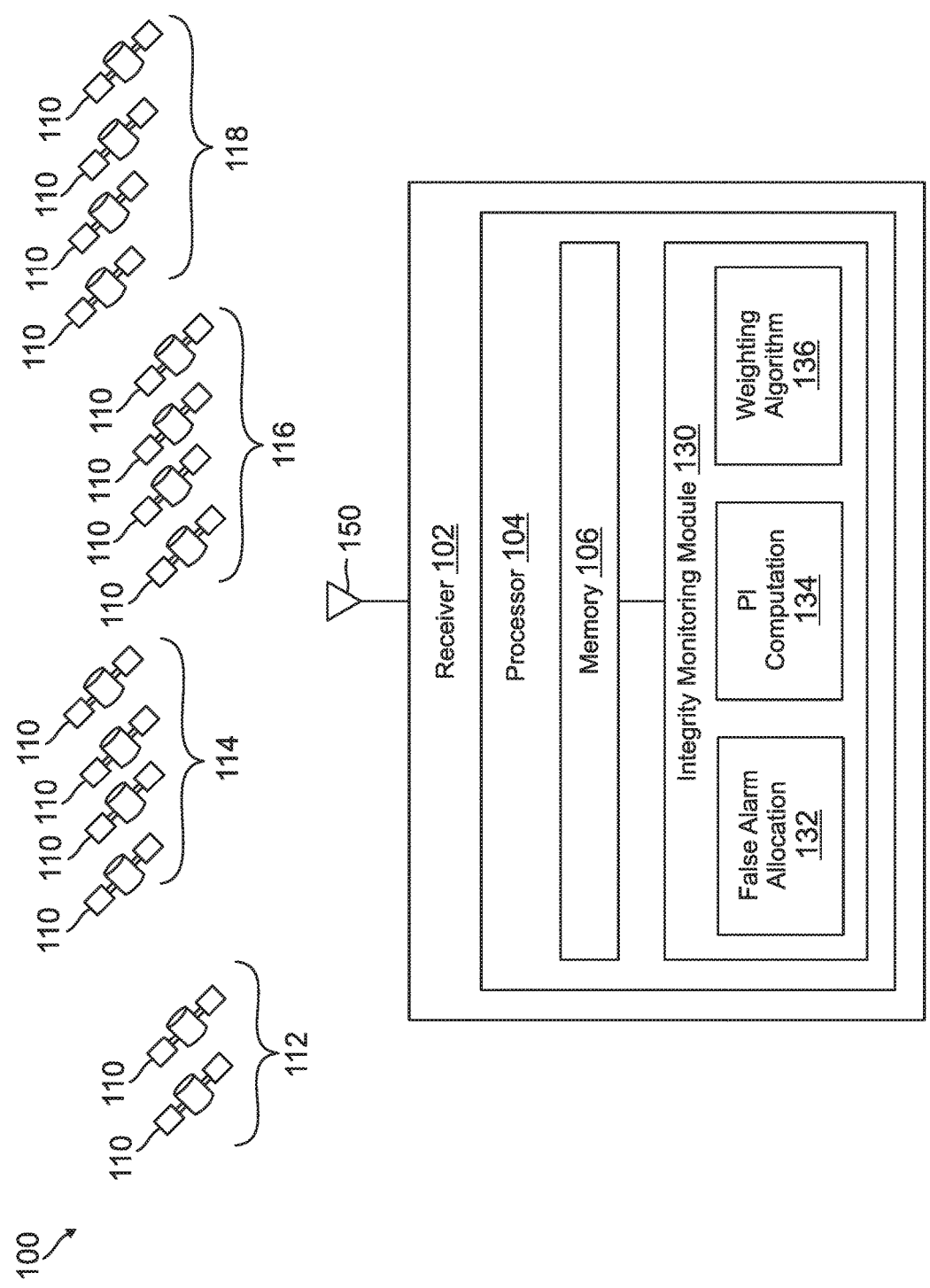
FIG. 1 is a block a diagram of example system for computing protection level according to embodiments of the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present description provide systems and methods for improving protection level computation for a GNSS receiver. Specifically, as disclosed by this specification below, lower protection levels can be computed by determining weights to allocate false alarm probability among individual sub-solutions computed based on sets of in-view satellites of the receiver. Although it is contemplated that the embodiments described herein may be implemented in aircraft, it is explicitly intended that these embodiments are not limited to an aircraft but may also include watercraft and ground operating vehicles, both piloted and autonomous.

FIG. 1 is a block diagram of example system 100 used in integrity monitoring for computed navigation solutions. System 100 includes a plurality of satellites 100 in view of global navigations solution system (GNSS) receiver 102. In exemplary embodiments, the plurality of satellites 110 can include satellites from more than one constellation, such as GPS, GLONASS, Galileo, BeiDou, etc. In exemplary embodiments, the plurality of satellites 110 can all be from a single constellation. GNSS receiver 102 receives signals from one or more satellites 110. The received signals can be used by receiver 102 to compute a navigation solution, which may include, but is not limited to, a position, a velocity, and/or time that the signal was received.

Receiver 102 includes at least one processor 104 that processes the signals received from one or more satellites 110. The processor 104 may be configured to execute code to implement an integrity monitoring module 130. In an example, integrity monitoring module 130 is stored in or coupled to a memory 106 included in receiver 102. In an example, memory 106 is included in or coupled to processor 104. In an example, the integrity monitoring module 130 may be a solution separation receiver autonomous integrity monitoring (SS-RAIM) module. In an example, the integrity monitoring module 130 may be an Advanced Receiver Autonomous Integrity Monitoring (ARAIM) module. Integrity monitoring module 130 groups the plurality of satellites 110 into a plurality of subsets, such as subsets 112, 114, 116, and 118 based on several factors including, but not limited to, the number of satellites and constellations available, the probabilities of satellite and constellation faults, integrity requirements, available processing power of receiver, etc.

Processor 104 is further configured to calculate one or more navigation sub-solutions. FIG. 1 shows an example of four navigation sub-solutions, wherein each of the sub-solutions is calculated such that one different subset from the plurality of subsets 112, 114, 116 and 118 is excluded. That is, a navigation sub-solution is calculated by excluding at least one of the subsets 112, 114, 116 and 118 and calculating a navigation solution with satellites 110 that are in the remaining subsets. For example, subset 112 can be excluded and a navigation solution with subsets 114, 116 and 118 can be computed. This process is repeated such that a plurality of sub-solutions is calculated when subsets 114, then 116 and then 118 are excluded and a navigation solution with the remaining (unexcluded) subsets is computed respectively.

The protection level can be further improved by providing weights to false alarm probability for individual sub-solutions. Conventionally, a single fault mode consumes majority of the budget allocated to probability of hazardous misleading information (PHMI). Because false alarm probability is the probability that a fault is detected when a fault does not exists, the detection threshold of each sub-solution can be set such that during fault-free operation, the test statistic exceeds the threshold with probability equal to or less than the false alarm allocation. Therefore, the threshold's magnitude is proportional to the sub-solution's false alarm allocation. The sub-solution with the largest PHMI contribution may benefit from a larger false alarm allocation as the detection threshold would be reduced, leading to a decrease in the protection level magnitude. Consequently, the systems and methods of the embodiments described herein run with the assumption that a fault mode's PHMI is correlated with the fault mode's optimal probability of false alarm allocation.

The total PHMI budget is divided between the horizontal and the vertical direction. It provides an upper bound to the probability that the separation between the true position of the vehicle including receiver 102 and the computed position output exceeds computed protection level without an issued alert. As such, integrity monitoring module 130, shown in FIG. 1, implements a protection level (PL) computation algorithm 134 such that:

$$P_{D\_computed>PL} + \Sigma_{i=1}^{Nss} P_{fault,i} \cdot P_{md,i} = \text{PHMI} \qquad \text{(Eq. 1)}$$

where $P_{D\_computed>PL}$ is the probability that the computed position output by receiver 102 using all in-view satellites is further from the true position of receiver 102 than the computed protection level, $P_{fault,i}$ is probability that a fault mode from which individual sub-solution i protects, occurs, $P_{md,i}$ is the probability of missed detection, and PHMI is the probability of hazardously misleading information budget. Missed detection probability is the probability that a fault mode occurs but is not detected by the receiver. Accordingly, a protection level is computed such that PHMI is equal to a sum of probability that the computed position output by receiver 102 is off the true position by more than the computed protection level and sum of products of probability of fault mode and probability of missed detection for all individual sub-solutions. In a further embodiment, the values for probability of fault mode and probability of missed detection for each of the individual sub-solutions are stored in memory 106 and can be accessed by integrity monitoring module 130 for retrieval at a later time.

In exemplary embodiments, the false alarm allocation values are stored in memory 106 and can be retrieved by the integrity monitoring module 130 for implementation of PL computation algorithm 134. In exemplary embodiments, $P_{D\_computed>PL}$ is $$2Q\left(\frac{PL-b_0}{\sigma^{(0)}}\right).$$

That is, it gives a probability that zero-mean normal (Gaussian) random variable will obtain an absolute value larger than $$\left(\frac{PL-b_0}{\sigma^{(0)}}\right)$$

standard deviations. As such, this probability is determined based on the computed protection level (PL).

In exemplary embodiments, $P_{md,i}$ is $$Q\left(\frac{PL-T_i-b_i}{\sigma^{(i)}}\right),$$

where $T_i$ is threshold computed for sub-solution i. In exemplary embodiments, $T_i$ is computed based on false alarm probability of the sub-solution i. In exemplary embodiments, the individual threshold is computed based on a separation covariance and the allocated probability of false alarm for the respective sub-solution. The separation covariance represents the statistical separation between the full solution created based on all satellites in view of receiver 102 and each individual sub-solution 112, 114, 116 and 118. Consequently, in one exemplary embodiment, integrity monitoring module 130 implements a protection level (PL) computation algorithm 134 such that:

$$2Q\left(\frac{PL-b_0}{\sigma^{(0)}}\right) + \sum_{i=1}^{Nss} P_{fault,i} \cdot Q\left(\frac{PL-T_i-b_i}{\sigma^{(i)}}\right) = PHMI \quad \text{(Eq. 2)}$$

In exemplary embodiments, Equation 2 may be pre-computed and stored in memory 106. As shown in Equation 2, computation of protection level PL is based on threshold $T_i$ computed for sub-solution i. Thus, the probability of missed detection for sub-solution i for the current iteration can be based on previously computed probability of false alarm allocation for sub-solution i. In exemplary embodiments, this previously computed probability of false alarm allocation is stored in memory 106 from a previous run of integrity monitoring module 130.

Integrity monitoring module 130 further implements a weighting algorithm 136 to compute a weight for each individual sub-solution as shown in Equation 3.

$$w_i = \frac{PHMI_i}{PHMI_{total}} \quad \text{(Eq. 3)}$$

Thus, weight for a respective individual sub-solution i is a fraction of the contribution to PHMI of the sub-solution i over the total PHMI. In some exemplary embodiments, $$PHMI_i = P_{fault,i} \cdot Q\left(\frac{PL-T_i-b_i}{\sigma^{(i)}}\right).$$

In exemplary embodiments, the weight $w_i$ for each individual sub-solution is stored in memory 106, which can be retrieved at a later time.

In some exemplary embodiments, the total PHMI is the sum of PHMIs of all of the individual sub-solutions. In other embodiments, the total PHMI may include the PHMI contribution by the full solution. That is, in some exemplary embodiments, the total PHMI may include $$2Q\left(\frac{PL-b_0}{\sigma^{(0)}}\right)$$

with the PHMI of each individual sub-solution. In some exemplary embodiments, the total PHMI may be represented by the whole PHMI budget. As the protection level is computed using numerical methods, in some exemplary embodiments, $PHMI_{total}$ may be slight lower than the PHMI budget. The PHMI contribution for each individual sub-solution and sum of the PHMIs computing a total PHMI can be determined by integrity monitoring module 130 by implementing PL computation algorithm 134 as shown in Equation 1. In exemplary embodiments, the total available PHMI budget is $10^{-7}$. That is, probability of hazardously misleading information provided by receiver 102 is to be limited to $10^{-7}$/hour.

In exemplary embodiments, integrity monitoring module 130 computes the PHMI based on probability of fault and the probability of missed detection in the respective sub-solution. Equation 4 shows computation of weight in an individual sub-solution i based on probability of fault and probability of missed detection.

$$w_i = \frac{P_{fault,i} \cdot P_{md,i}}{\sum_{k=1}^{Nss} P_{fault,k} \cdot P_{md,k}} \quad \text{(Eq. 4)}$$

As shown in Equation 3, the weight for a respective individual sub-solution i is determined by first determining a product of probability of fault ($P_{fault,i}$) and probability of missed detection ($P_{md,i}$) in that individual sub-solution, and then dividing the product of the respective individual sub-solution by a sum of the products of all sub-solutions.

In exemplary embodiments, the values of missed detection probability and fault probability are pre-determined. In some exemplary embodiments, the pre-determined values of missed detection probability and fault probability may be based upon the current geometry of satellites. In some exemplary embodiments, the pre-determined values of missed detection probability and fault probability may be based upon an output from a previous run of integrity monitoring performed for the full solution. In some exemplary embodiments, the pre-determined values of missed detection probability and fault probability may be based on probability of false alarm allocation values obtained from a previous run of Equation 1. In some examples, during one initial run, the missed detection probability can optionally be based on even false alarm allocation values distributed to sub-solutions.

The integrity monitoring module 130 further implements false alarm allocation algorithm 132 to use the computed weight $w_i$ for computation of the probability of false alarm allocation for the individual sub-solution i. As shown in Equation 5, the false alarm allocation for the individual sub-solution i is determined by multiplying the computed weight $w_i$ with the total probability of false alarm budget (See Equation 5).

$$P_{fa,i} = w_i \cdot P_{fa,total} \quad \text{(Eq. 5)}$$

In exemplary embodiments, the total probability of false alarm available to be allocated is retrieved from memory 106. In exemplary embodiments, the weighted probability of false alarm $P_{fa,i}$ for individual sub-solution i is stored in memory 106 for later retrieval.

The false alarm allocation computed as in Equation 5 may be impractically low. In exemplary embodiments, $P_{fa,i}$ is manipulated such that it is always greater than a lower bound. In exemplary embodiments, individual $P_{fa,i}$ may be further manipulated such that the sum of all $P_{fa,i}$ is equal to $P_{fa,total}$.

Integrity monitoring module 130 then implements PL computation algorithm 134 and uses the weighted probability of false alarm, $P_{fa,i}$, allocated to each individual sub-solution to compute a weighted protection level. In exemplary embodiments, an individual threshold $T_i$ is computed for sub-solution i based on the weighted probability of false alarm allocated to sub-solution i. These individual thresholds are then used for computation of a weighted protection level in Equation 2.

In exemplary embodiments, when the weighted protection level is above an alert threshold, an alarm is triggered and the vehicle is directed to use a different procedure for computing the navigation solution. In exemplary embodiments, the protection level to be computed is a horizontal protection level and the alert threshold is a horizontal alert limit. In exemplary embodiments, the protection level to be computed is a vertical protection level and the alert threshold is a vertical alert limit. In exemplary embodiments, the protection level to be computed can be vertical and/or horizontal. In exemplary embodiments, the alert thresholds can be vertical and/or horizontal.

The functions and processes performed by processor 104 can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The processing device 104 can also include functions with software programs, firmware, or other computer readable instructions for carrying out various process tasks, calculations, and control functions used in the present embodiments.

The memory device 106 can be any appropriate tangible and non-transitory processor readable medium used for storage of processor readable instructions or data structures. Suitable processor readable media can include tangible media such as magnetic or optical media. For example, tangible media can include physical devices such as, but not limited to a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc.

Figure 2:
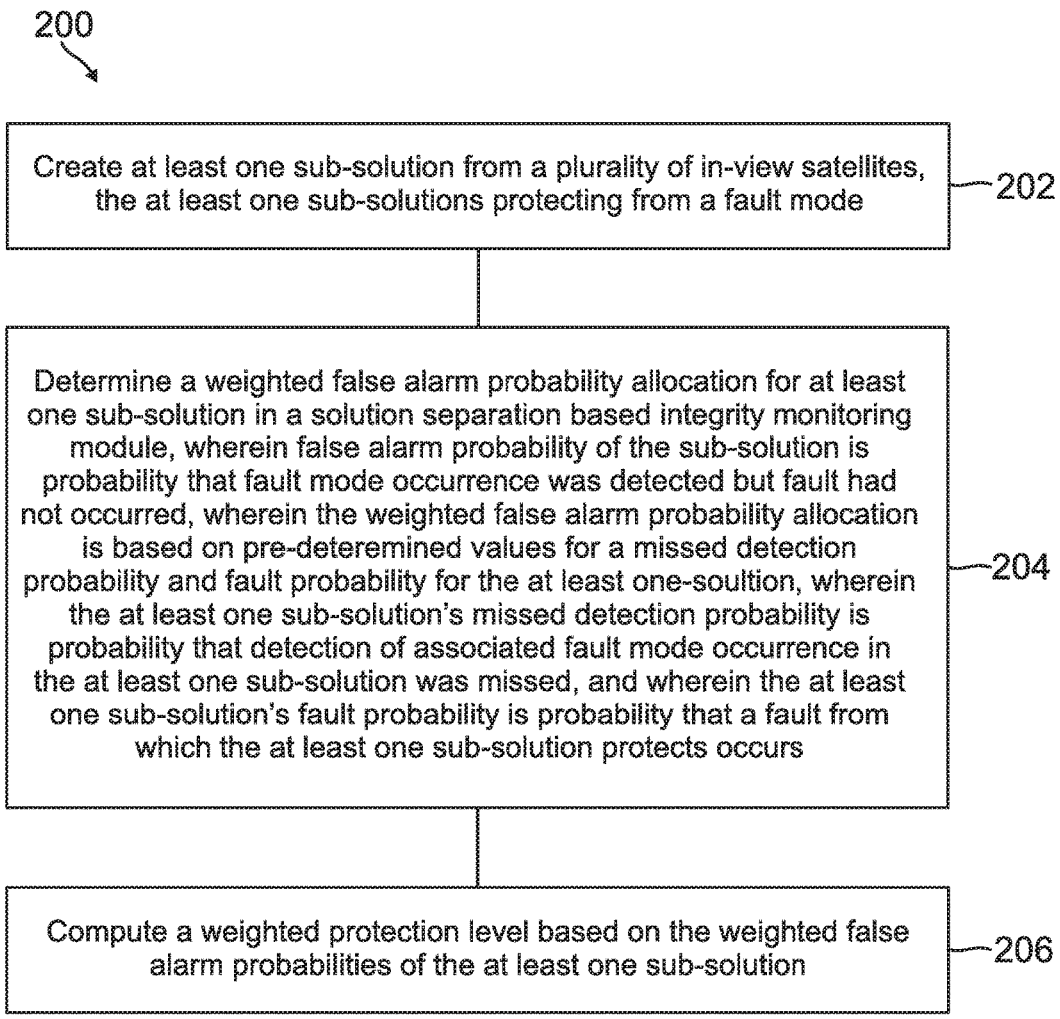
FIG. 2 is an example method for computing protection level according to embodiments of the present application.

FIG. 2 is a flow diagram of an example method 200 of protection level by a GNSS receiver, such as the GNSS receiver 102 disclosed with respect to FIG. 1. It should be understood that method 200 may be implemented in conjunction with any of the various embodiments and implementations described in this disclosure above or below. As such, elements of method 200 may be used in conjunction with, in combination with, or substituted for elements of those embodiments. Further, the functions, structures and other description of elements for such embodiments described herein may apply to like named elements of method 200 and vice versa.

Method 200 begins at block 202 with creating at least one sub-solution from a plurality of in-view satellites, such as satellites 110, the at least one sub-solution protecting from a fault mode. In one example of method 200, the plurality of in-view satellites are from multiple constellations. In one example of method 200, creating at least one sub-solution further comprises excluding a set of potentially faulty satellites from a full solution. In one example of method 200, creating at least one sub-solution further comprises, creating a plurality of sub-solutions.

Method 200 proceeds to block 204 with determining a weighted false alarm probability allocation for at least one sub-solution in a solution separation based integrity monitoring module, such as an integrity monitoring module 130. The false alarm probability of the sub-solution is probability that fault mode occurrence was detected but fault had not occurred, wherein the weighted false alarm probability allocation is based on pre-determined values for a missed detection probability and fault probability for the at least one sub-solution. The at least one sub-solution's missed detection probability is probability that detection of associated fault mode occurrence in the at least one sub-solution was missed, and the at least one sub-solution's fault probability is probability that a fault mode from which the at least one sub-solution protects occurs.

In some exemplary embodiments, pre-determining values of missed detection probability and fault probability may be based upon the current geometry of satellites. In some exemplary embodiments, the pre-determining values of missed detection probability and fault probability may be based upon an output from a previous run of integrity monitoring performed for the full solution.

In one example of method 200, weighted false alarm probability allocation is determined based on a weight for each individual sub-solution. In exemplary embodiments, weights for each individual sub-solution are stored in a memory, such as memory 106 for later retrieval. In some examples of method 200, determining a weight for each individual sub-solution further comprises determining a fraction of the probability of hazardously misleading information (PHMI) for one of the at least one sub-solution divided by a sum of the PHMIs of all of the at least one sub-solution. In one example, method 200 further comprises storing weighted false alarm probability of the sub-solution in a memory, such as memory 106.

Finally, method 200 proceeds to block 206 with computing a weighted protection level based on the weighted false alarm probabilities of the at least one sub-solution. In one example of method 200, computing a weighted protection level further comprises computing a threshold for each sub-solution from the at least one sub-solution based on the weighted false alarm probability of the sub-solution; and computing a weighted protection level based on the threshold for the at least one sub-solutions.

EXAMPLE EMBODIMENTS

Example 1 includes a Global Navigation Satellite System (GNSS) receiver comprising: at least one processor, wherein the processor is configured to: perform integrity monitoring in a solution separation based integrity monitoring module, wherein the solution separation based integrity monitoring module is further configured to: determine a weighted false alarm probability allocation for at least one sub-solution in a solution separation based integrity monitoring module, wherein the weighted false alarm probability allocation is based on pre-determined values for missed detection probability and fault probability for the sub-solution, wherein the at least one sub-solution is created by excluding a set of potentially faulty satellites from a full solution, wherein a fault mode occurs when there is a faulty satellite in the excluded set of potentially faulty satellite, wherein the at least one sub-solution's missed detection probability is probability that detection of associated fault mode occurrence in a sub-solution was missed, and wherein the at least one sub-solution's fault probability is probability that the fault mode occurs; compute a weighted protection level based on the weighted false alarm probability.

Example 2 includes the receiver of Example 1, wherein to compute a weighted protection level, the at least one processor is further configured to: compute a threshold for the at least one sub-solution based on the weighted false alarm probability of the at least one sub-solution; and compute a weighted protection level based on computed threshold for the at least one sub-solution.

Example 3 includes the receiver of any of Examples 1-2, wherein the receiver is configured to receive signals from a plurality of in-view satellites, and wherein the plurality of in-view satellites are from multiple constellations.

Example 4 includes the receiver of any of Examples 1-3, wherein to determine a weighted false alarm probability for at least one sub-solution, the processor is further configured to: determine a weight to be allocated to the at least one sub-solution, and store the determined weight for at least one sub-solution in a memory.

Example 5 includes the receiver of any of Examples 1-4, wherein to determine a weighted false alarm probability allocation for at least one sub-solution, the processor is further configured to: divide a probability of hazardous misleading information (PHMI) for the at least one sub-solution by a total PHMI.

Example 6 includes the receiver of any of Examples 1-5, wherein pre-determined values of missed detection probability and fault probability are based on a previous run of solution separation based integrity monitoring module.

Example 7 includes the receiver of any of Examples 1-6, wherein the pre-determined values of missed detection probability and fault probability are based on current geometry.

Example 8 includes a method of computing protection level in a GNSS receiver, the method comprising: creating at least one sub-solution from a plurality of in-view satellites, the at least one sub-solutions protecting from a fault mode; determining a weighted false alarm probability allocation for at least one sub-solution in a solution separation based integrity monitoring module, wherein false alarm probability of the sub-solution is probability that fault mode occurrence was detected but fault had not occurred, wherein the weighted false alarm probability allocation is based on pre-determined values for a missed detection probability and fault probability for the at least one sub-solution, wherein the at least one sub-solution's missed detection probability is probability that detection of associated fault mode occurrence in the at least one sub-solution was missed, and wherein the at least one sub-solution's fault probability is probability that a fault mode from which the at least one sub-solution protects occurs; computing a weighted protection level based on the weighted false alarm probabilities of the at least one sub-solution.

Example 9 includes the method of Example 8, wherein creating at least one sub-solution further comprises excluding a set of potentially faulty satellites from a full solution.

Example 10 includes the method of any of Examples 8-9, further comprising receiving signals from the plurality of in-view satellites, and wherein the plurality of satellites are from multiple constellations.

Example 11 includes the method of any of Examples 8-10, wherein pre-determined values for a missed detection probability and fault probability for the at least one sub-solution may be based on the current geometry.

Example 12 includes the method of any of Examples 8-11, wherein determining a weighted false alarm probability allocation for at least one sub-solution in a solution separation based integrity monitoring module further comprises: determining a weight to be allocated to the at least one sub-solution, and storing the determined weight for at least one sub-solution in a memory.

Example 13 includes the method of any of Examples 8-12, wherein computing a weighted protection level based on the weighted false alarm probability further comprises: computing a threshold for each sub-solution from the at least one sub-solution based on the weighted false alarm probability of the sub-solution; and computing a weighted protection level based on the threshold for the at least one sub-solutions.

Example 14 includes the method of any of Examples 8-13, wherein determining a weighted false alarm probability allocation for at least one sub-solution in a solution separation based integrity monitoring module further comprises determining a weight based on fraction of the probability of hazardous misleading information (PHMI) for one of the at least one sub-solution divided by a sum of the PHMIs of all of the at least one sub-solution.

Example 15 includes the method of any of Examples 8-14, wherein the pre-determined values of missed detection probability and fault probability may be based upon an output from a previous run of computing protection level in a GNSS receiver.

Example 16 includes a non-transitory computer-readable medium having computer-executable instructions stored thereon which, when executed by one or more processors, cause the one or more processors to: determine a weighted false alarm probability allocation for at least one sub-solution in a solution separation based integrity monitoring module, wherein the weighted false alarm probability allocation is based on pre-determined values for missed detection probability and fault probability for the sub-solution, wherein the at least one sub-solution is created by excluding a set of potentially faulty satellites from a full solution, wherein a fault mode occurs when there is a faulty satellite in the excluded set of potentially faulty satellite, wherein the at least one sub-solution's missed detection probability is probability that detection of associated fault mode occurrence in a sub-solution was missed, and wherein the at least one sub-solution's fault probability is probability that the fault mode occurs; and compute a weighted protection level based on the weighted false alarm probability.

Example 17 includes the non-transitory computer-readable medium of Example 16, wherein to compute a weighted protection level based on the weighted false alarm probability, the instructions cause the processor to: compute a threshold for the at least one sub-solution based on the weighted false alarm probability of the at least one sub-solution; and compute a weighted protection level based on computed threshold for the at least one sub-solution.

Example 18 includes the non-transitory computer-readable medium of any of Examples 16-17, wherein the instructions cause the processor to store the weighted false alarm probability of the sub-solution in a memory.

Example 19 includes the non-transitory computer-readable medium of any of Examples 16-18, wherein to determine a weighted false alarm probability allocation for at least one sub-solution in a solution separation based integrity monitoring module, the instructions cause the processor to divide a probability of hazardous misleading information (PHMI) for the at least one sub-solution by a total PHMI.

Example 20 includes the non-transitory computer-readable medium of any of Examples 16-19, wherein the instructions cause the processor to process signals received from a plurality of in-view satellites, and wherein the plurality of in-view satellites are from multiple constellations.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A Global Navigation Satellite System (GNSS) receiver comprising:
   at least one processor, wherein the processor is configured to:
   perform integrity monitoring in a solution separation based integrity monitoring module, wherein the solution separation based integrity monitoring module is further configured to:
   determine a weighted false alarm probability allocation for at least one sub-solution in a solution separation based integrity monitoring module,
   wherein the weighted false alarm probability allocation is based on pre-determined values for missed detection probability and fault probability for the sub-solution,
   wherein the at least one sub-solution is created by excluding a set of potentially faulty satellites from a full solution, wherein a fault mode occurs when there is a faulty satellite in the excluded set of potentially faulty satellite,
   wherein the at least one sub-solution's missed detection probability is probability that detection of associated fault mode occurrence in a sub-solution was missed, and
   wherein the at least one sub-solution's fault probability is probability that the fault mode occurs;
   compute a weighted protection level based on the weighted false alarm probability.

2. The receiver of claim 1, wherein to compute a weighted protection level, the at least one processor is further configured to:
   compute a threshold for the at least one sub-solution based on the weighted false alarm probability of the at least one sub-solution; and
   compute a weighted protection level based on computed threshold for the at least one sub-solution.

3. The receiver of claim 1, wherein the receiver is configured to receive signals from a plurality of in-view satellites, and wherein the plurality of in-view satellites are from multiple constellations.

4. The receiver of claim 1, wherein to determine a weighted false alarm probability for at least one sub-solution, the processor is further configured to:
   determine a weight to be allocated to the at least one sub-solution, and
   store the determined weight for at least one sub-solution in a memory.

5. The receiver of claim 1, wherein to determine a weighted false alarm probability allocation for at least one sub-solution, the processor is further configured to:
   divide a probability of hazardous misleading information (PHMI) for the at least one sub-solution by a total PHMI.

6. The receiver of claim 1, wherein pre-determined values of missed detection probability and fault probability are based on a previous run of solution separation based integrity monitoring module.

7. The receiver of claim 1, wherein the pre-determined values of missed detection probability and fault probability are based on current geometry.

8. A method of computing protection level in a GNSS receiver, the method comprising:
   creating at least one sub-solution from a plurality of in-view satellites, the at least one sub-solutions protecting from a fault mode;
   determining a weighted false alarm probability allocation for at least one sub-solution in a solution separation based integrity monitoring module, wherein false alarm probability of the sub-solution is a probability that fault mode occurrence was detected but a fault had not occurred;
   wherein the weighted false alarm probability allocation is based on pre-determined values for a missed detection probability and fault probability for the at least one sub-solution;
   wherein the at least one sub-solution's missed detection probability is probability that detection of associated fault mode occurrence in the at least one sub-solution was missed; and
   wherein the at least one sub-solution's fault probability is probability that a fault mode from which the at least one sub-solution protects occurs; and
   computing a weighted protection level based on the weighted false alarm probabilities of the at least one sub-solution.

9. The method of claim 8, wherein creating at least one sub-solution further comprises excluding a set of potentially faulty satellites from a full solution.

10. The method of claim 8, further comprising receiving signals from the plurality of in-view satellites, and wherein the plurality of satellites are from multiple constellations.

11. The method of claim 8, wherein pre-determined values for a missed detection probability and fault probability for the at least one sub-solution may be based on the current geometry.

12. The method of claim 8, wherein determining a weighted false alarm probability allocation for at least one sub-solution in a solution separation based integrity monitoring module further comprises:
   determining a weight to be allocated to the at least one sub-solution, and storing the determined weight for at least one sub-solution in a memory.

13. The method of claim 8, wherein computing a weighted protection level based on the weighted false alarm probability further comprises:
   computing a threshold for each sub-solution from the at least one sub-solution based on the weighted false alarm probability of the sub-solution; and
   computing a weighted protection level based on the threshold for the at least one sub-solutions.

14. The method of claim 8, wherein determining a weighted false alarm probability allocation for at least one sub-solution in a solution separation based integrity monitoring module further comprises determining a weight based on fraction of the probability of hazardous misleading information (PHMI) for one of the at least one sub-solution divided by a sum of the PHMIs of all of the at least one sub-solution.

15. The method of claim 8, wherein the pre-determined values of missed detection probability and fault probability may be based upon an output from a previous run of computing protection level in a GNSS receiver.

16. A non-transitory computer-readable medium having computer-executable instructions stored thereon which, when executed by one or more processors, cause the one or more processors to:
   determine a weighted false alarm probability allocation for at least one sub-solution in a solution separation based integrity monitoring module,
      wherein the weighted false alarm probability allocation is based on pre-determined values for missed detection probability and fault probability for the sub-solution,
      wherein the at least one sub-solution is created by excluding a set of potentially faulty satellites from a full solution, wherein a fault mode occurs when there is a faulty satellite in the excluded set of potentially faulty satellite,
      wherein the at least one sub-solution's missed detection probability is probability that detection of associated fault mode occurrence in a sub-solution was missed, and
      wherein the at least one sub-solution's fault probability is probability that the fault mode occurs; and
   compute a weighted protection level based on the weighted false alarm probability.

17. The non-transitory computer-readable medium of claim 16, wherein compute a weighted protection level based on the weighted false alarm probability, the instructions cause the processor to:
   compute a threshold for the at least one sub-solution based on the weighted false alarm probability of the at least one sub-solution; and
   compute a weighted protection level based on computed threshold for the at least one sub-solution.

18. The non-transitory computer-readable medium of claim 16, wherein the instructions cause the processor to store the weighted false alarm probability of the sub-solution in a memory.

19. The non-transitory computer-readable medium of claim 16, wherein to determine a weighted false alarm probability allocation for at least one sub-solution in a solution separation based integrity monitoring module, the instructions cause the processor to divide a probability of hazardous misleading information (PHMI) for the at least one sub-solution by a total PHMI.

20. The non-transitory computer-readable medium of claim 16, wherein the instructions cause the processor to process signals received from a plurality of in-view satellites, and wherein the plurality of in-view satellites are from multiple constellations.

\* \* \* \* \*